May 23, 1967  J. A. THACHUK  3,321,030
SELF-ADJUSTING IMPLEMENT HITCH FOR TRACTORS
Filed Oct. 20, 1965  2 Sheets-Sheet 1
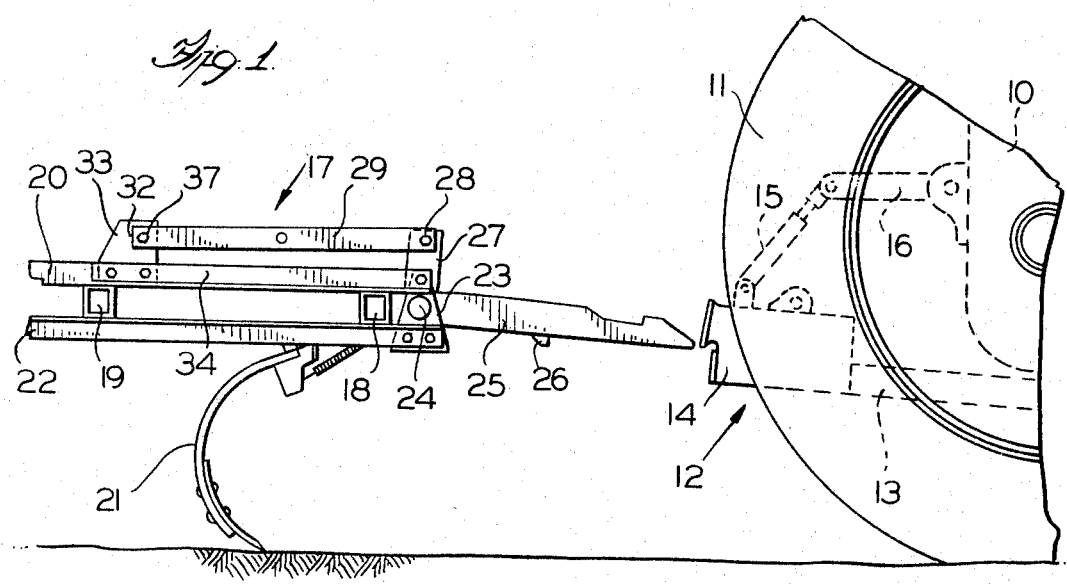
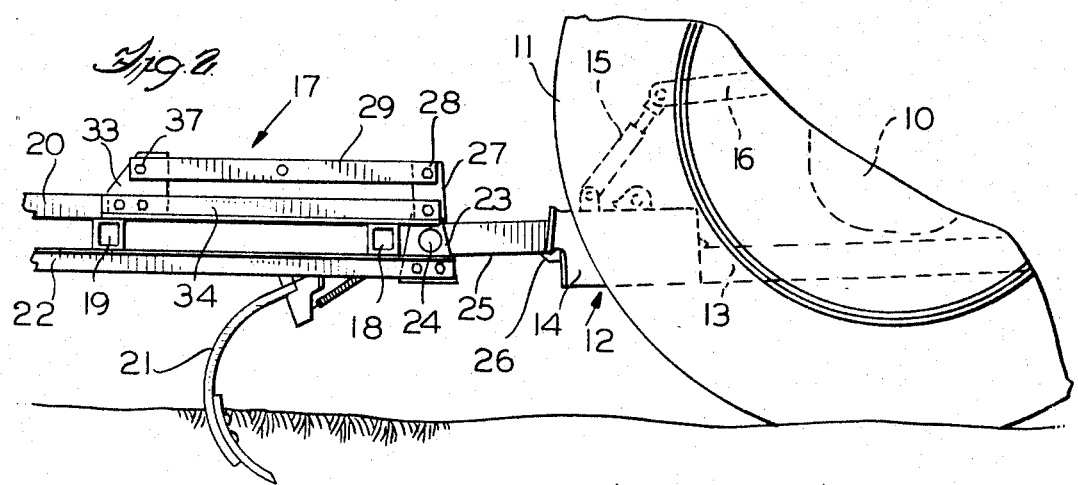
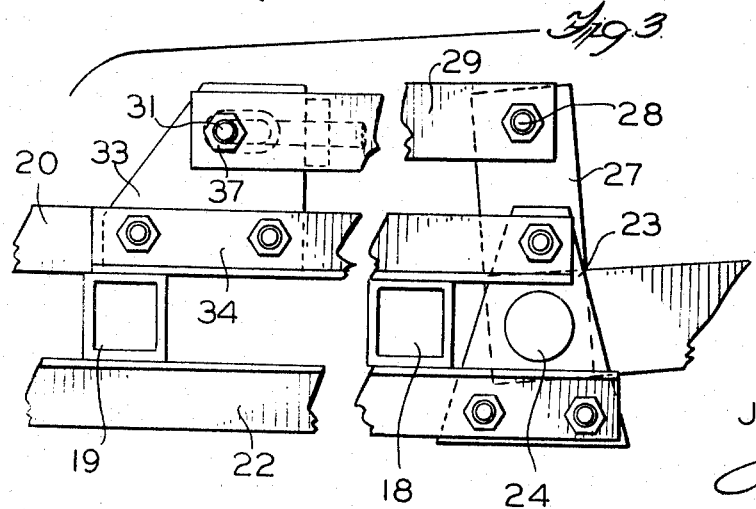
INVENTOR
JOHN A. THACHUK
ATTORNEY May 23, 1967 J. A. THACHUK 3,321,030
SELF-ADJUSTING IMPLEMENT HITCH FOR TRACTORS
Filed Oct. 20, 1965 2 Sheets-Sheet 2
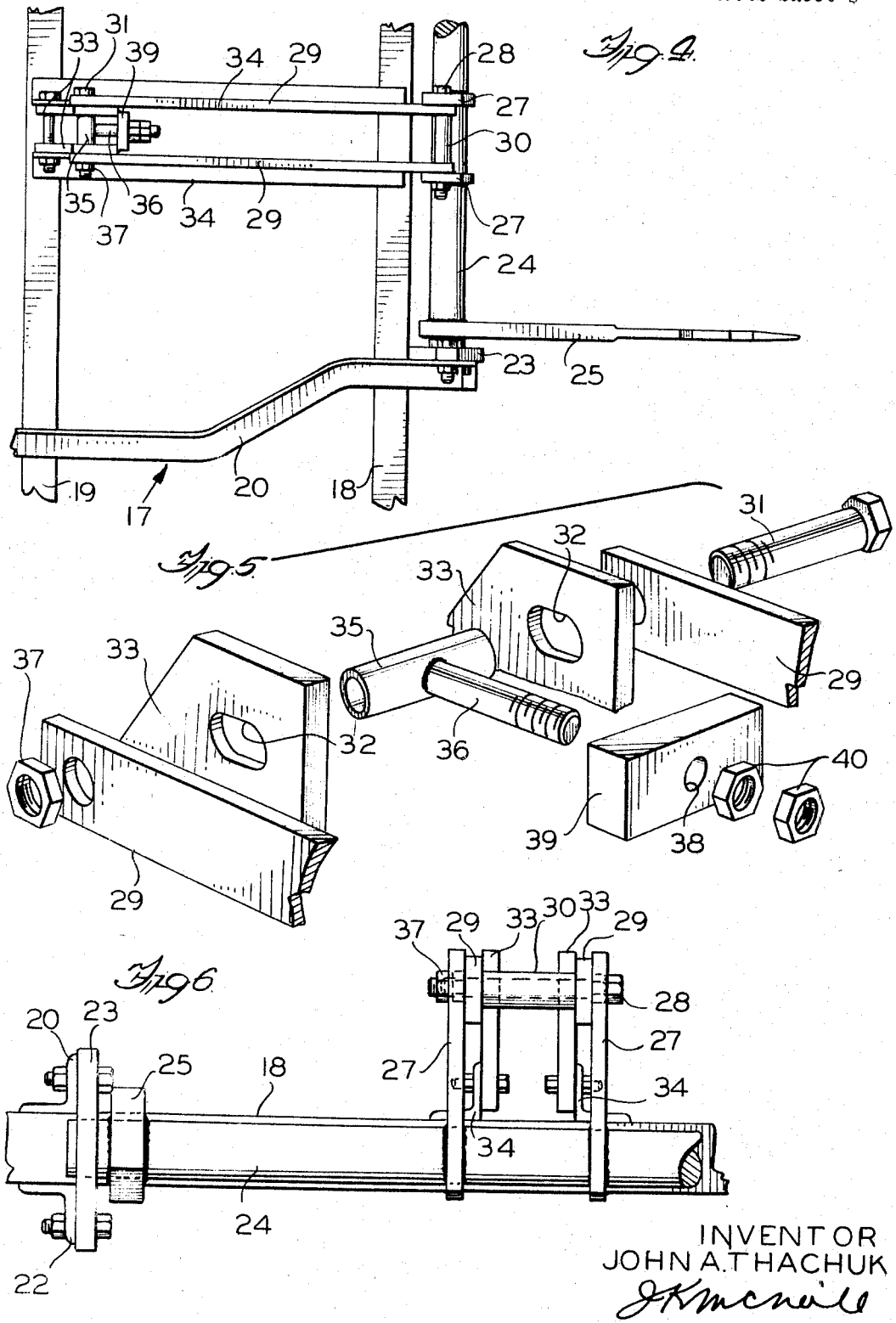
INVENTOR
JOHN A. THACHUK
ATTORNEY

United States Patent Office 3,321,030
Patented May 23, 1967

3,321,030
SELF-ADJUSTING IMPLEMENT HITCH FOR TRACTORS
John A. Thachuk, Dundas, Ontario, Canada, assignor to International Harvester Company, Chicago, Ill., a corporation of New Jersey
Filed Oct. 20, 1965, Ser. No. 498,797
6 Claims. (Cl. 172—452)

This invention relates to agricultural implements and particularly to an implement attachment for a tractor.

An object of the invention is the provision of novel means for attaching an implement to a tractor.

Another object of the invention is the provision of self-adjusting hitch means for a tractor mounted implement.

Other objects and advantages of the invention will become clear from the following detailed description when read in conjunction with the accompanying drawings wherein:

FIGURE 1 is a view in side elevation showing the rear end of a tractor prior to the attachment of an implement thereto;

FIGURE 2 is a view similar to FIGURE 1 showing the connection made between the tractor and implement;

FIGURE 3 is an enlarged detail, with parts broken away, showing a portion of the implement of FIGURES 1 and 2;

FIGURE 4 is an enlarged plan view showing a portion of the implement of this invention;

FIGURE 5 is an exploded view illustrating the relationship of the parts of the implement hitch-adjusting mechanism, and FIGURE 6 is a front view of the structure shown in FIGURE 4.

Referring to the drawings, the numeral 10 designates the rear end of a tractor having drive wheels 11 and draw frame 12 including arms 13, only one of which is shown, each of which has affixed to its rear end a socket 14 to which is connected a lifting link 15, attached at its upper end to a lift arm 16, swingable in a vertical plane by power operated means, not shown, carried by the tractor, to effect a controlled raising and lowering of the draw frame 12.

The implement of the invention shown in the drawings is a field cultivator and has a generally rectangular frame 17 supported by laterally spaced wheels, not shown, and includes transversely extending bars 18 and 19, to which are affixed longitudinally extending, inwardly disposed angle bars 20, only one of which is shown, earthworking tools 21 being secured to the bars 18 and 19 in any well-known manner. Additional longitudinally extending bars 22 are secured to the undersides of transverse bars 18 and 19.

The inwardly disposed pairs of bars 20 and 22 are parallel and project forwardly beyond the bar 18 at the front end of the implement, and secured to the forward ends of each laterally spaced pair of bars 20, 22, is a plate 23, the laterally spaced plates 23 being apertured to rotatably receive the ends of a transverse shaft 24, to which are affixed laterally spaced, forwardly projecting implement hitch members in the form of prongs 25, only one of which is shown. The prongs 25 are adapted to be slidably received in the laterally spaced socket numbers 14 of the tractor draw frame 12 until the socket is engaged by a stop 26 on the prong. Suitable means are provided for releasably locking each prong member in its socket member 14.

As shown in FIGURE 1, the implement is resting on the surface of the ground and is ready for attachment to the tractor. The draw frame 12 is lowered into alignment between the prongs 25 and sockets 14 and the tractor backed until the prongs are received in the sockets, whereupon the implement becomes integral with the tractor and can be raised and lowered by vertically swinging the lift arms 16.

The height and disposition of the prongs 25 with respect to the ground level is adjustable by the provision of means comprising a pair of lugs 27 affixed to the central portion of shaft 24 and projecting upwardly therefrom. The upper ends of the lugs are connected by a bolt 28 upon which are pivotally mounted the forward ends of a pair of horizontal links 29, generally parallel to the frame bars 20, the forward ends of the links 29 being separated by a spacer 30 mounted on bolt 28.

The rear ends of links 29 are apertured to receive a bolt 31 slidably received in longitudinally extending slots 32 provided in a pair of spaced brackets 33 secured to angle bars 34 mounted on transverse frame bars 18 and 19.

Brackets 33 are spaced by a sleeve 35 receiving bolt 31 and having a stem 36 affixed thereto. A nut 37 holds bolt 31 in place. Stem 36 is slidable in an opening 38 provided in a block 39 affixed to brackets 33.

By virtue of the bolt and slot connection of links 29 to brackets 33, when the implement is disconnected from the tractor and resting upon the ground the hitch members 25 swing downwardly until bolt 31 engages the forward end of slot 32. Upon receipt of prongs 25 in sockets 14 and forward motion of the tractor, the earth-working tools 21 penetrate the ground and bolt 31 moves rearwardly in slot 32 allowing prongs 25 to swing upwardly to the position shown in FIGURE 2. Rearward movement of bolt 31 in slot 32 is adjustably limited by the provision of nuts 40 on the end of stem 36. Therefore, the extent of rearward movement of bolt 31 in the slots is determined by the depth of operation desired for the tools 21. Thus, upon lifting the implement above the ground by operation of lift arms 16 to a transport position, bolt 31 moves to the forward end of the slots, and upon return of the implement and release of the tractor therefrom, prongs 25 always return to the hitching position shown. Furthermore, upon reconnection of the implement to the tractor and operation thereof the earth-working tools return to the same selected operating depth.

It is believed that the construction and operation of the self-adjusting hitch mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In an implement attachment for a tractor having a draw frame and lift means for raising and lowering the draw frame and holding it in a selected adjusted position, a tool-carrying frame, a hitch structure including a shaft pivotally mounted on the tool-carrying frame, hitch means carried by the shaft arranged for integral connection with said draw frame to be raised and lowered therewith and including an arm affixed to said shaft, the pivotal mounting of said shaft on the tool-carrying frame accommodating tilting of the latter when said draw frame and said hitch structure are lifted, and connecting means between said arm and said tool-carrying frame for lifting the latter in response to lifting the draw frame and said hitch structure, said connecting means including lost motion accommodating limited free pivotal movement of the hitch structure relative to the tool-carrying frame.

2. The invention set forth in claim 1, wherein said connecting means comprises a link pivotally connected at one end to said arm and having a slidable connection at its other end with the tool-carrying frame.

3. The invention set forth in claim 2 wherein an anchor member is affixed to the tool-carrying frame and has a slot therein, said other end of said link carrying a pin slidably receivable in said slot.

4. The invention set forth in claim 3, wherein means are provided for adjusting the effective length of said link.

5. The invention set forth in claim 2, wherein said link is vertically spaced from and substantially parallel to said tool-carrying frame.

6. The invention set forth in claim 1, wherein said draw frame includes laterally spaced draft elements operatively connected to said shaft and an upper link vertically spaced from said draft element connected at one end to said arm and at the other end to the tractor.

References Cited by the Examiner

UNITED STATES PATENTS

| | | | |
|---|---|---|---|
| 2,704,018 | 3/1955 | Oehler et al. | 172—449 X |
| 2,747,486 | 5/1956 | Wilson | 172—449 X |
| 2,776,613 | 1/1957 | Orelind | 172—275 |

LEO FRIAGLIA, *Primary Examiner.*